US011249671B2

(12) United States Patent
George et al.

(10) Patent No.: US 11,249,671 B2
(45) Date of Patent: Feb. 15, 2022

(54) METHODS FOR IMPROVED DATA REPLICATION ACROSS HYBRID CLOUD VOLUMES USING DATA TAGGING AND DEVICES THEREOF

(71) Applicant: NetApp, Inc., Sunnyvale, CA (US)

(72) Inventors: Tijin George, Sunnyvale, CA (US);
Jose Mathew, Santa Clara, CA (US);
Harsha Vardhan Reddy Perannagari, San Jose, CA (US)

(73) Assignee: NETAPP, INC., Sunnyvale, CA (US)

( * ) Notice: Subject to any disclaimer, the term of this patent is extended or adjusted under 35 U.S.C. 154(b) by 246 days.

(21) Appl. No.: 15/581,730

(22) Filed: Apr. 28, 2017

(65) Prior Publication Data
US 2018/0314430 A1 Nov. 1, 2018

(51) Int. Cl.
*G06F 3/06* (2006.01)
*G06F 12/0888* (2016.01)
(Continued)

(52) U.S. Cl.
CPC ............ *G06F 3/065* (2013.01); *G06F 3/067* (2013.01); *G06F 3/0619* (2013.01);
(Continued)

(58) Field of Classification Search
CPC ........ G06F 3/065; G06F 3/0619; G06F 3/067; G06F 12/0868; G06F 12/0888;
(Continued)

(56) References Cited

U.S. PATENT DOCUMENTS

| 9,424,437 | B1* | 8/2016 | Ancin | .................... H04L 63/105 |
|---|---|---|---|---|
| 10,140,187 | B1* | 11/2018 | Chan | .................... G06F 11/1458 |
| 2004/0128363 | A1* | 7/2004 | Yamagami | .......... G06F 11/2069 709/217 |
| 2010/0257142 | A1* | 10/2010 | Murphy | .............. G06F 11/1464 707/681 |

(Continued)

FOREIGN PATENT DOCUMENTS

| EP | 2799973 A1 | 11/2014 |
|---|---|---|
| EP | 2883147 A1 | 6/2015 |
| WO | 2015088505 A1 | 6/2015 |

OTHER PUBLICATIONS

International Search Report and Written Opinion for Corresponding PCT Application No. PCT/US2017/067627, dated Mar. 13, 2018, 11 pages.

*Primary Examiner* — Alicia M Antoine
(74) *Attorney, Agent, or Firm* — Troutman Pepper Hamilton Sanders LLP

(57) ABSTRACT

Methods, non-transitory computer readable media, and computing devices that receive data from a primary storage node. The data is stored in a primary volume within a primary composite aggregate hosted by the primary storage node. A determination is made when the data is tagged to indicate that the data is stored in the primary volume on a remote data storage device of the primary composite aggregate. The data is stored on another remote data storage device without storing the data in a local data storage device, when the determining indicates that the data is tagged to indicate that the data is stored in the primary volume on a remote data storage device of the primary composite aggregate. Accordingly, this technology allows data placement to remain consistent across primary and secondary volumes and facilitates efficient operation of secondary storage nodes by eliminating two-phase writes for data stored on cloud storage devices.

16 Claims, 5 Drawing Sheets

(51) Int. Cl.
*G06F 12/0868* (2016.01)
*G06F 11/20* (2006.01)

(52) U.S. Cl.
CPC ...... *G06F 12/0868* (2013.01); *G06F 12/0888* (2013.01); *G06F 3/0685* (2013.01); *G06F 11/2094* (2013.01); *G06F 11/2097* (2013.01); *G06F 2212/263* (2013.01); *G06F 2212/286* (2013.01)

(58) Field of Classification Search
CPC ............... G06F 3/0865; G06F 11/2094; G06F 11/2097; G06F 2212/263; G06F 2212/286
USPC ........................................................ 707/609
See application file for complete search history.

(56) References Cited

U.S. PATENT DOCUMENTS

| | | | |
|---|---|---|---|
| 2011/0161723 A1* | 6/2011 | Taleck | G06F 11/1453 714/4.11 |
| 2014/0006357 A1 | 1/2014 | Davis et al. | |
| 2014/0108335 A1* | 4/2014 | Chan | G06F 17/30011 707/610 |
| 2016/0224436 A1* | 8/2016 | Wolfe | G06F 16/245 |
| 2016/0274806 A1* | 9/2016 | Barnes | G06F 12/0813 |
| 2017/0004192 A1* | 1/2017 | Masurekar | H04L 63/0218 |
| 2017/0070492 A1* | 3/2017 | Rubin | G06F 17/30312 |
| 2017/0109184 A1 | 4/2017 | Ramani et al. | |
| 2017/0132866 A1* | 5/2017 | Kuklinski | G07D 7/20 |
| 2017/0208052 A1* | 7/2017 | Jai | H04L 63/08 |
| 2018/0121114 A1* | 5/2018 | Borlick | G06F 3/065 |
| 2018/0309622 A1* | 10/2018 | Ilaria | H04L 41/0681 |

* cited by examiner

METHODS FOR IMPROVED DATA REPLICATION ACROSS HYBRID CLOUD VOLUMES USING DATA TAGGING AND DEVICES THEREOF

FIELD

This technology relates to managing data storage networks, and more particularly to methods and devices for improved data replication in cloud environments.

BACKGROUND

Storage nodes or servers in storage networks generally store data across multiple data storage devices that together comprise a data container, which is also referred to herein as an aggregate. Storage nodes may employ various forms of local data storage devices, such as hard disk drives, solid state drives, flash drives, or tape devices, as well as remote data storage devices, such as cloud storage devices or repositories for example.

Typically, the data storage devices host one or more data stores or volumes within the aggregates, which are associated with file systems that define an overall logical arrangement of storage space in a storage network. Volumes can be established to have tiering policies in order to store data in multiple performance tiers. For example, composite aggregates can include volumes that span relatively high performance flash data storage devices and relatively low performance cloud storage devices for warmer and colder data, respectively.

To facilitate load sharing, disaster recovery, or archival functionality, for example, data is often replicated from primary volumes to secondary volumes. When the replicated data is received at a secondary storage node, the data is stored in a secondary volume of a composite aggregate in a relatively high performance tier associated with a local storage device (e.g., a flash storage device). Subsequently, the data may be moved to a remote or cloud storage device associated with the secondary volume of the composite aggregate as it becomes colder based on a stored policy.

Accordingly, replication currently requires a two-phased write and post-processing irrespective of the type of storage or tier from which the replicated data originated. The additional processing is computationally expensive. Moreover, storage administrators have difficulty providing appropriately-sized performance tier storage at a secondary storage node, and often allocate enough flash memory, for example, to store most or all of a primary volume, which is costly and inefficient.

DETAILED DESCRIPTION

Figure 1:
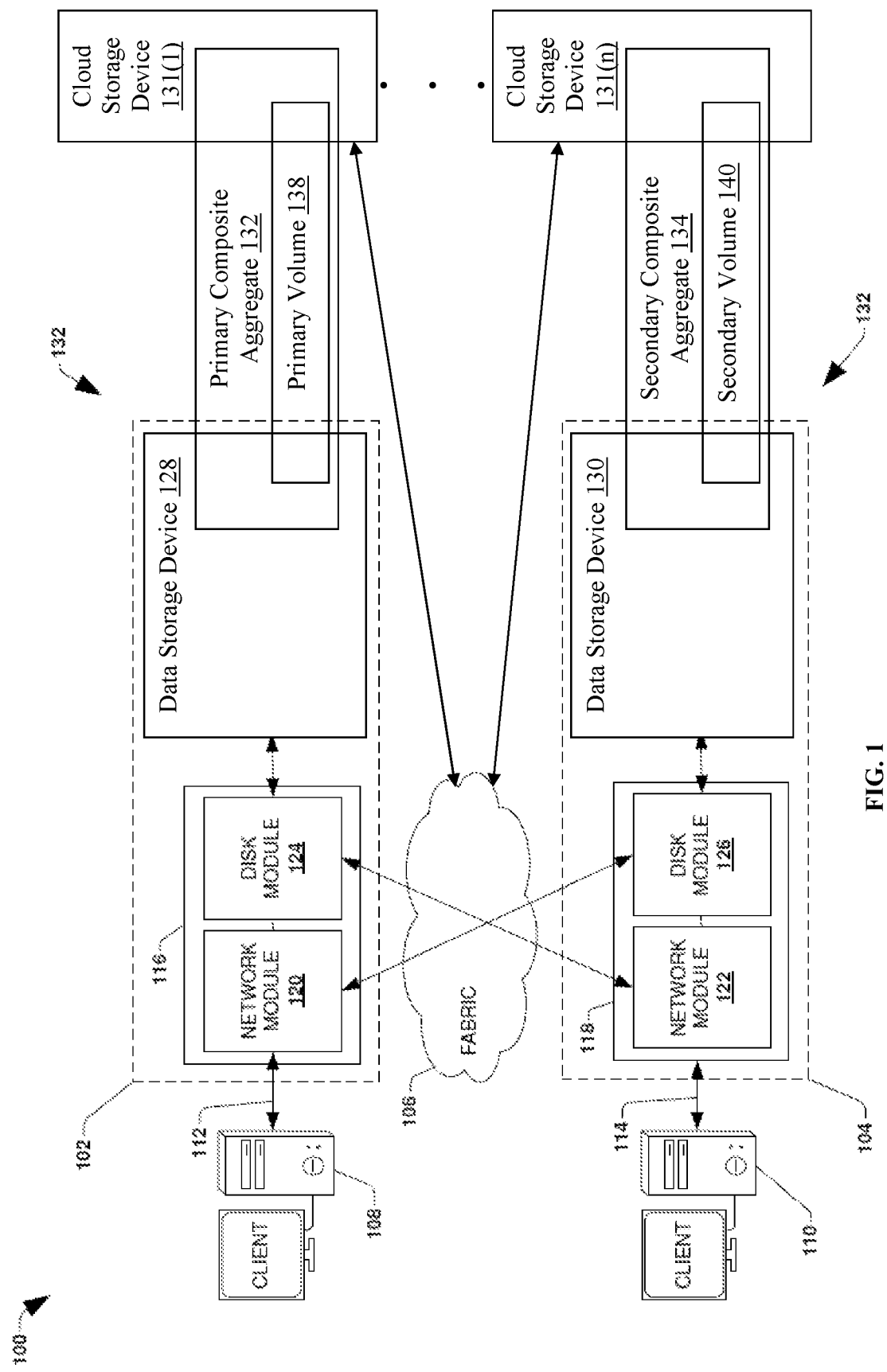
FIG. 1 is a block diagram of a network environment with exemplary primary and secondary data storage computing devices with primary and secondary nodes.

FIG. 1 is a block diagram illustrating a clustered network environment 100 that may implement one or more aspects of the technology described and illustrated herein. The clustered network environment 100 includes primary and secondary data storage systems or computing devices 102 and 104 that are coupled over a cluster fabric 106 facilitating communication between the primary and secondary data storage systems 102 and 104 (and one or more modules, component, etc. therein, such as, primary and secondary nodes 116 and 118, for example). While two data storage systems 102 and 104 and primary and secondary nodes 116 and 118 are illustrated in FIG. 1, any suitable number of such components is contemplated. This technology provides a number of advantages including methods, non-transitory computer readable media, and devices that facilitate improved data replication in cloud environments by allowing data placement to remain consistent across primary and secondary volumes and eliminating two-phase writes for data replicated from cloud storage devices.

In this example, primary and secondary nodes 116 and 118 include storage controllers (e.g., primary node 116 may be a primary or local storage controller and secondary node 118 may be a secondary or remote storage controller) that provide client devices, such as host devices 108 and 110, with access to data stored within local data storage devices 128 and 130 and cloud storage devices 131(1)-131(n). Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

The clustered networks of the examples described and illustrated herein are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include primary and secondary data storage systems (e.g., 102 and 104) residing in a same geographic location (e.g., in a single onsite rack of data storage devices).

In the illustrated example, one or more of the host devices 108 and 110, which may comprise, for example, client devices, personal computers (PCs), computing devices used for storage (e.g., storage servers), and other computers or peripheral devices (e.g., printers), are coupled to the respective primary and secondary data storage systems 102 and 104 by storage network connections 112 and 114. Network connections 112 and/or 114 may include a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc.

Illustratively, the host devices 108 and 110 may be general-purpose computers running applications, and may interact with the primary and secondary data storage systems 102 and 104 using a client/server model for exchange of information. That is, the host devices 108 and 110 may request data from the primary and secondary data storage systems 102 and 104 (e.g., data on a storage device managed by a network storage control configured to process I/O commands issued by the host devices 108 and 110 for the storage device), and the primary and secondary data storage systems 102 and 104 may return results of the request to the host devices 108 and 110 via the storage network connections 112 and 114.

The primary and secondary nodes 116 and 118 on primary and secondary data storage systems 102 and 104 can include network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria.

In an example, the primary node 116 may be located on a first storage site and the secondary node 118 may be located at a second storage site. The primary and secondary nodes 116 and 118 may be configured according to a disaster recovery configuration where a surviving node provides switchover access to storage devices in the event a disaster occurs at a disaster storage site (e.g., the primary node 116 provides host device 108 with switchover data access to storage devices 130 and 131(n) in the event a disaster occurs at the second storage site). In other examples, the secondary node 118 can be configured according to an archival configuration and/or the primary and secondary nodes 116 and 118 can be configured based on another type of replication arrangement (e.g., for load sharing purposes).

As illustrated in the clustered network environment 100, primary and secondary nodes 116 and 118 can comprise various functional components that coordinate to provide a distributed storage architecture for the cluster. For example, the primary and secondary nodes 116 and 118 can include network modules 120 and 122 and disk modules 124 and 126. Network modules 120 and 122 can be configured to allow the primary and secondary nodes 116 and 118 (e.g., network storage controllers) to connect with host devices 108 and 110 over the storage network connections 112 and 114, for example, allowing the host devices 108 and 110 to access data stored in the distributed storage system.

Further, the network modules 120 and 122 can provide connections with one or more other components through the cluster fabric 106 including cloud storage devices 131(1)-131(n). For example, in FIG. 1, the network module 120 of primary node 116 can access the data storage device 130 by sending a request through the disk module 126 of secondary node 118. The fabric 160 can include one or more local and/or wide area computing networks embodied as Infiniband, Fibre Channel (FC), or Ethernet networks, for example, although other types of networks supporting other protocols can also be used.

Disk modules 124 and 126 can be configured to connect data storage devices 128 and 130, such as disks or arrays of disks, flash memory, or some other form of data storage, to the primary and secondary nodes 116 and 118. The primary and secondary nodes 116 and 118 can be interconnected by the cluster fabric 106, for example, allowing respective nodes in the cluster to access data on data storage devices 128 and 130 and 131(1)-131(n) connected to different nodes in the cluster. Often, disk modules 124 and 126 communicate with the data storage devices 128 and 130 according to the SAN protocol, such as SCSI or FCP, for example. Thus, as seen from an operating system on primary and secondary nodes 116 and 118, the data storage devices 128 and 130 can appear as locally attached to the operating system. In this manner, different primary and secondary nodes 116 and 118, etc. may access data blocks through the operating system, rather than expressly requesting abstract files.

While the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, one or more of the host devices 108 and 110 can be networked with the primary and secondary nodes 116 and 118 in the cluster, over the storage networking connections 112 and 114. As an example, respective host devices 108 and 110 that are networked to a cluster may request services (e.g., exchanging of information in the form of data packets) of primary and secondary nodes 116 and 118 in the cluster, and the primary and secondary nodes 116 and 118 can return results of the requested services to the host devices 108 and 110. In one embodiment, the host devices 108 and 110 can exchange information with the network modules 120 and 122 residing in the nodes 116 and 118 (e.g., network hosts) in the primary and secondary data storage systems 102 and 104.

In one example, the primary and secondary storage systems 102 and 104 host primary and secondary composite aggregates 132 and 134, although any number of composite aggregates can be maintained by the primary and secondary storage systems 102 and 104. The primary and secondary composite aggregates 132 and 134 correspond to physical local and remote data storage devices, such as local flash storage and remote disk storage in cloud storage devices 131(1)-131(n), for example, although the primary and secondary composite aggregates 132 and 134 can include any other types of data storage devices.

The primary and secondary composite aggregates 132 and 134 include primary and secondary volumes 138 and 140 in this example, although any number of volumes can be included in the primary and secondary composite aggregates 132 and 134. The primary and secondary volumes 138 and 140 are virtual data stores that define an arrangement of storage and one or more file systems within the network environment 100. While the examples described and illustrated herein are with respect to composite aggregates 132 and 134 including primary and secondary volumes 138 and 140 with data stored locally at the primary and secondary storage systems 102 and 104 as well as remotely at the cloud storage devices 131(1)-131(n), this technology can also be used for other types of aggregates and volumes that do not employ tiered storage.

Volumes, including primary and secondary volumes 138 and 140, can span a portion of a disk, a collection of disks, or portions of disks, for example, and typically define an overall logical arrangement of file storage on disk space in the storage system. In one example a volume can comprise stored data as one or more files or objects that reside in a hierarchical directory structure within the volume. Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In an example, each of the cloud storage devices 131(1)-131(n) includes a processor, a memory, and a communication interface, which are all coupled together by a bus or other communication link, although the cloud storage devices 131(1)-131(n) can have other types and numbers of components or other elements. One or more of the cloud storage devices 131(1)-131(n) can be a server computing device or any other type of storage device configured to store large quantities of files or objects at the direction of the primary and secondary storage systems 102 and 104.

Figure 2:
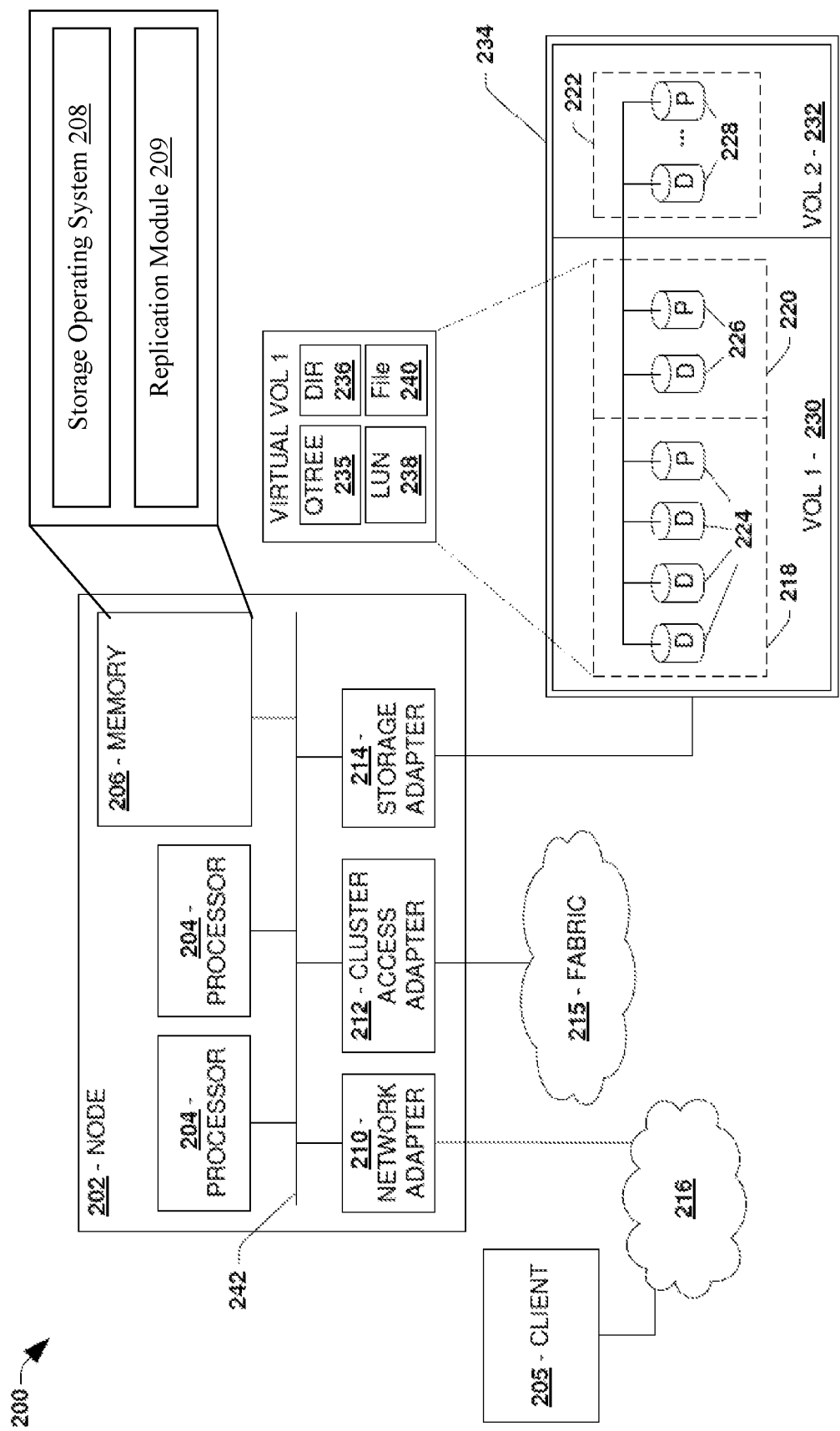
FIG. 2 is a block diagram of an exemplary one of the data storage computing devices shown in FIG. 1.

FIG. 2 is an illustrative example of a data storage system or computing device 200 (e.g., 102 or 104 in FIG. 1), providing further detail of an embodiment of components that may implement the technology described and illustrated herein. The data storage system 200 comprises a node 202 (e.g., node 116 or 118 in FIG. 1), and a data storage device 234 (e.g., data storage devices 128 or 130 in FIG. 1). A client device 205 (e.g., 108 or 110 in FIG. 1) can be connected to the node 202 over a network 216, for example, to provide access to files and/or other data stored on the data storage device 234 or the cloud storage devices 131(1)-131(n) illustrated in FIG. 1.

The data storage device 234 can include mass storage devices, such as disks 224, 226, and 228 of a disk array 218, 220, and 222. It will be appreciated that the techniques and systems, described herein, are not limited by the example embodiment. For example, disks 224, 226, and 228 may comprise any type of mass storage devices, including but not limited to magnetic disk drives, flash memory, and any other similar media adapted to store information, including, for example, data (D) and/or parity (P) information.

The node 202 in this particular example includes one or more processors 204, a memory 206, a network adapter 210, a cluster access adapter 212, and a storage adapter 214 interconnected by a system bus 242. The node 202 also includes a storage operating system 208 installed in the memory 206 that can, for example, implement a Redundant Array of Independent (or Inexpensive) Disks (RAID) optimization technique to optimize a reconstruction process of data of a failed disk in an array.

The storage operating system 208 can also manage communications for the data storage system 200, and communications between other data storage systems that may be in a clustered network, such as attached to a cluster fabric 215 (e.g., 106 in FIG. 1). Thus, the node 202 can respond to host device requests to manage data on the data storage device 234 or cloud storage devices 131(1)-131(n) (e.g., or additional clustered devices) in accordance with the host device requests.

The storage operating system 208 can also establish one or more file systems on the data storage system 200, where a file system can include software code and data structures that implement a persistent hierarchical namespace of files and directories, for example. As an example, when a new data storage device (not shown) is added to a clustered network system, the storage operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, and 214 for storing related software application code and data structures. The processors 204 and adapters 210, 212, and 214 may, for example, include processing elements and/or logic circuitry configured to execute the software code and manipulate the data structures. The storage operating system 208, portions of which are typically resident in the memory 206 and executed by the processing elements, functionally organizes the data storage system 200 by, among other things, invoking storage operations in support of a file service implemented by the data storage system 200. Other processing and memory mechanisms, including various computer readable media, may be used for storing and/or executing application instructions pertaining to the techniques described and illustrated herein. For example, the operating system can also utilize one or more control files (not shown) to aid in the provisioning of virtual machines.

In this particular example, the memory 206 includes a replication module 209, although other types and/or numbers of applications or modules can also be included in other examples. The replication module 209 is configured to replicate data, such as may be stored the primary volume 138, to the secondary volume 140, in one example. In this example, the replication module 209 generally facilitates retrieval and copying of data stored on the cloud storage device 131(1) in the primary volume 138 to the secondary volume associated with the secondary node 118 such that the replicated data can be written directly to the cloud storage device 131(n).

More specifically, the replication module 209 retrieves data to be replicated from the primary volume 138, determines whether the data is retrieved from the data storage device 128 or cloud storage device 131(1), and tags the data if retrieved from the cloud storage device 131(1) prior to sending a copy of the data to the secondary node 118. Thereby, the replication module 109 communicates to the secondary node 118 that the tagged data can be written directly to the cloud storage device 131(n), as described and illustrated in more detail later.

The network adapter 210 in this example includes the mechanical, electrical and signaling circuitry needed to connect the data storage system 200 to a client 205 over a network 216, which may comprise, among other things, a point-to-point connection or a shared medium, such as a local area network. The client 205 (e.g., 108 or 110 of FIG. 1) may be a general-purpose computer configured to execute applications. As described above, the client 205 may interact with the data storage system 200 in accordance with a client/host model of information delivery. In some examples, the network adapter 210 further communicates (e.g., using TCP/IP) via the fabric 215 (e.g., via a WAN of the fabric 215) with the cloud storage devices 131(1)-131(n) to process storage operations associated with data stored thereon.

The storage adapter 214 cooperates with the storage operating system 208 executing on the node 202 to access information requested by the client 205 (e.g., access data on a storage device managed by a network storage controller). The information may be stored on any type of attached array of writeable media such as magnetic disk drives, flash memory, and/or any other similar media adapted to store information.

In the exemplary data storage system 200, information can be stored in data blocks on the disks 224, 226, and 228, although the data could also be stored in blocks hosted on the cloud storage devices 131(1)-131(n). The storage adapter 214 can include input/output (I/O) interface circuitry that couples to the disks over an I/O interconnect arrangement, such as a storage area network (SAN) protocol (e.g., Small Computer System Interface (SCSI), iSCSI, hyper-SCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the client 205 over the network 216 (and/or sent to another node attached to the cluster over the cluster fabric 215).

In one embodiment, to facilitate access to data stored on the disks or other structures 224, 226, and 228 of the data storage devices 128 and 130 and/or the cloud storage devices 131(1)-131(n), the storage operating system 208 may implement a file system (e.g., write anywhere file system) that logically organizes the information as a hierarchical structure of directories and files. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files or objects within physical and/or virtual volumes, including primary and secondary volumes 138 and 140, which can be associated with respective volume identifiers, such as file system identifiers (FSIDs). A physical volume corresponds to at least a portion of physical storage devices whose address, addressable space, location, etc. does not change, such as at least some of one or more data storage devices 128 and 130 or cloud storage devices 131(1)-131(n) (e.g., a Redundant Array of Independent (or Inexpensive) Disks (RAID system)). Typically the location of the physical volume does not change in that the (range of) address(es) used to access it generally remains constant.

A virtual volume, in contrast, is stored over an aggregate of disparate portions of different physical storage devices. The virtual volume, such as primary and secondary volumes 138 and 140, may be a collection of different available portions of different physical storage device locations, such as some available space from each of the disks 224, 226, and/or 228 and/or the cloud storage devices 131(1)-131(n), for example. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one example, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230 or 232 (e.g., primary or secondary volume 138 or 140) through the storage adapter 214, for example, a connection between the node 202 and the one or more LUNs 238 underlying the volume 230 or 232 is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 or 232 by using one or more addresses that identify the one or more LUNs 238.

The examples also may be embodied as one or more non-transitory computer readable media having machine or processor-executable instructions stored thereon for one or more aspects of the present technology, as described and illustrated by way of the examples herein, which when executed by the processors 204, cause the processors 204 to carry out the steps necessary to implement the methods of this technology, as described and illustrated with the examples herein. In some examples, the executable instructions are configured to perform one or more steps of a method, such as one or more of the exemplary methods described and illustrated herein with reference to FIGS. 3-5, for example.

Figure 3:
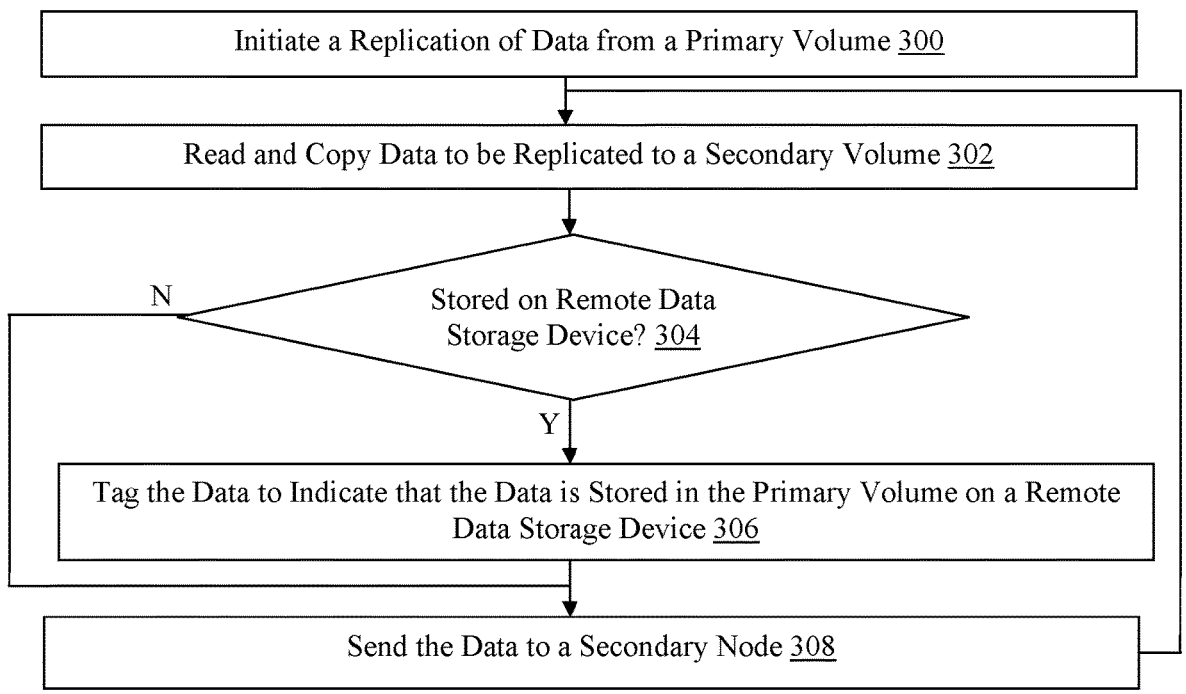
FIG. 3 is a flowchart of an exemplary method for facilitating improved data replications in cloud environments by the exemplary primary storage node shown in FIGS. 1-2.

Referring to FIGS. 1-3, an exemplary method for facilitating improved data replication in cloud environments by the exemplary primary node 116 is illustrated. In step 300 in this particular example, the primary node 116 initiates a replication of data from the primary volume 138. The primary node 116 can initiate the replication of the primary volume 138 in response to instructions received from an administrator or based on an automated process and current network conditions, for example.

The primary volume 138 in this example includes data stored in the form of blocks organized by objects, in both the data storage device 128 and the cloud storage device 131(1), although other types of volumes with data stored in other locations and in different formats can also be used. The replication can be initiated to support load sharing, fault tolerance, or archival functionality within the clustered network environment 100, although replication can also be utilized for other purposes in other examples.

In step 302, the primary node 116 reads data from the primary volume 138 to be replicated to the secondary volume 140 in the secondary composite aggregate 134. The primary node 116 then generates a copy of the data, which can be metadata or user data, for example, and can be read from the data storage device 128 or the cloud storage device 131(1). While the replication in this example requires a read operation for data already stored in the primary composite aggregate 132, other types of replication can also be used.

In step 304, the primary node 116 determines whether the data is stored on a remote data storage device, which in this example is the cloud storage device 131(1) or a local data storage device, such as the data storage device 128. The determination can be made by the primary node 116 based on an identifier associated with the data or any other indication of the source of the data. For example, the data can be identified by a block number (e.g., an aggregate or physical volume block number (PVBN)) that is within a range known by the primary node 116 to be allocated for data stored on either the data storage device 128 or the cloud storage device 131(1). Other methods of determining where the data is stored within the primary composite aggregate 132 can also be used. If the primary node 116 determines that the data is stored on a remote data storage device, then the Yes branch is taken to step 306.

In step 306, the primary node 116 tags the data to indicate that the data is stored in the primary volume 138 on a remote data storage device, such as the cloud storage device 131(1). The tag can be any type of indicator or value that the secondary node 118 is preconfigured to interpret as indicating that the data is stored on a remote storage device in the primary composite aggregate 132. The tag can be embedded with the data itself, included with the data as metadata, or incorporated into a component or header of a message used to send the replicated data to the secondary node 118, for example, and other types of indicators can also be used.

In other examples, only data that is determined to be stored on a local data storage device is tagged and, in yet other examples, both data stored in a local data storage device and data stored in a remote data storage device is tagged with different tags to indicate the respective storage locations. Since there are only two possible storage location and possible tags, any type of tag that is utilized in these examples indicates whether the data is stored in the primary volume 138 on a remote data storage device.

Accordingly, the absence of a tag, in examples in which only data stored on a local data storage device is tagged, is considered to be a tag indicating that the data is stored on a remote data storage device. Subsequent to tagging the data in step 306, or if the primary node 116 determines in step 304 that the data is not stored on a remote data storage device and the No branch is taken, the primary node 116 proceeds to step 308.

In step 308, the primary node 116 sends the data to the secondary node 118. The data can be sent as tagged in iterations in which the primary node 116 determines that the data is stored on a remote data storage device and tags the data in step 306. The data can be sent over the fabric 106 and/or a cluster interconnect, for example. By tagging replicated data at the primary node 116 to indicate whether the data is stored on a remote data storage device, this technology advantageously facilitates maintenance of the tiering layout of the primary volume 138 at the secondary volume 140, as described and illustrated in more detail later.

Figure 4:
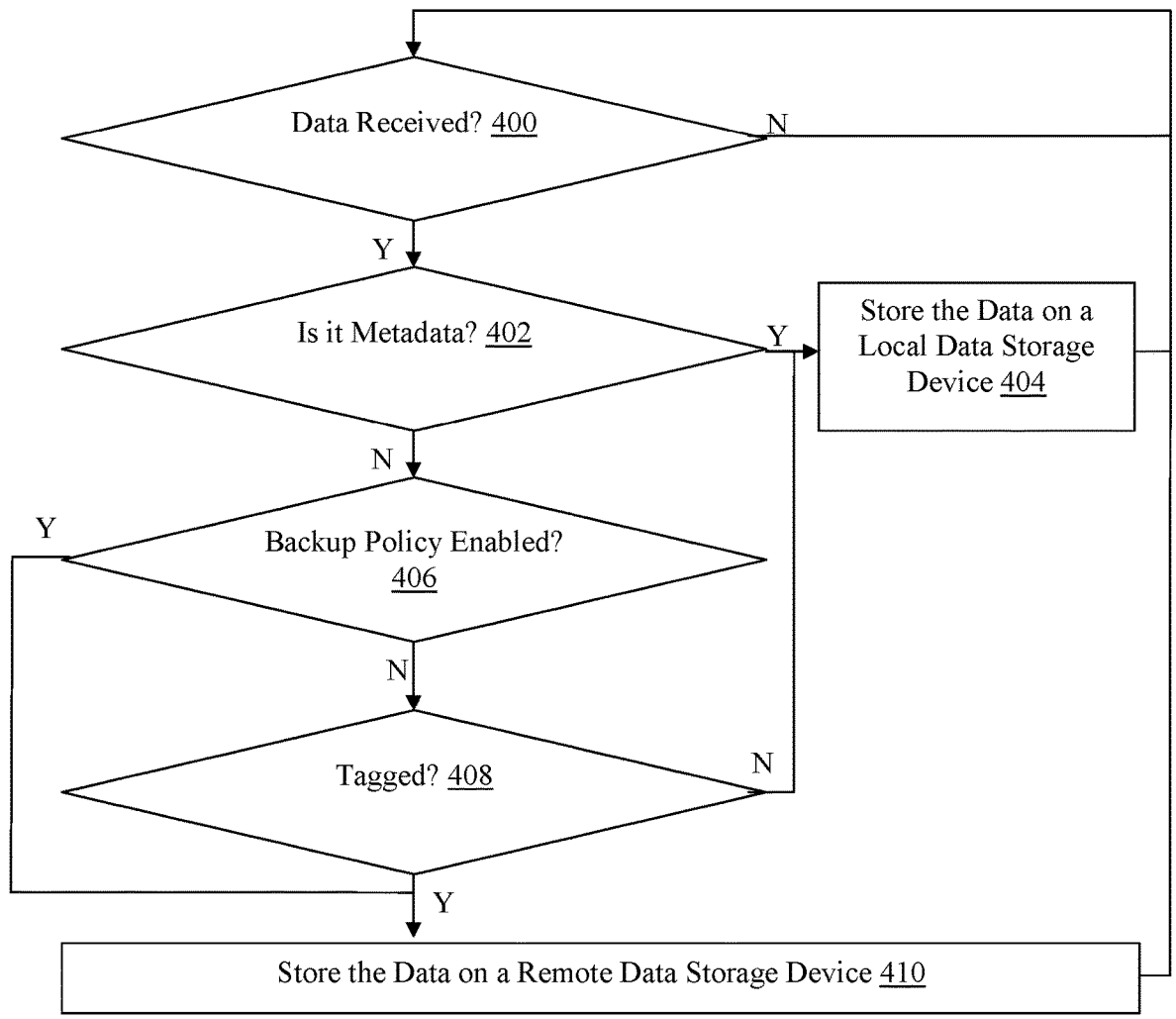
FIG. 4 is a flowchart of an exemplary method for facilitating improved data replications in cloud environments by the exemplary secondary storage node shown in FIGS. 1-2.

Referring to FIGS. 1, 2, and 4, an exemplary method for facilitating improved data replication in cloud environments by the exemplary secondary node 118 is illustrated. In step 400 in this example, the secondary node 118 determines whether replicated data has been received from the primary node 116. The data can be sent by the primary node 116 as described and illustrated earlier with reference to step 308 of FIG. 3.

If the secondary node 118 determines that the data has not been received from the primary node 116, then the No branch is taken back to step 400 and the secondary node 118 effectively waits to received replicated data from the primary node 116. However, if the secondary node 118 determines in step 400 that replicated data has been received from the primary node 116, then the Yes branch is taken to step 402.

In step 402, the secondary node 118 determines whether the data is metadata, such as based on an analysis of the content or another indication associated with the message that included the data and was received from the primary node 116. In this example, metadata is always stored in a local data storage device to facilitate analytics, cataloging, or efficient look-ups, for example, although metadata can also be stored elsewhere in other examples. Accordingly, if the secondary node 118 determines that the data is metadata, then the Yes branch is taken to step 404.

In step 404, the secondary node 118 stores the data on a local storage device, such as data storage device 130, for example. The metadata may be tagged by the primary node 116 prior to being received if stored in a local storage device associated with the primary node 116, such as the data storage device 128. However, irrespective of any tagging, the secondary node 118 in this example stores any metadata associated with user data in a local storage device. Referring back to step 402, if the secondary node 118 determines that the data is not metadata, then the No branch is taken to step 406.

In step 406, the secondary node 118 determines whether a backup policy or mode is enabled. In example in which the secondary node 118 is operating as an archive, the secondary node 118 can write data received from the primary node 116 directly to a remote data storage device without storing it in a relatively high performance tier in a local data storage device. Since the secondary node 118 is a backup or archive node in this example, there will not be any active accesses of the data and it can be stored in a relatively low performance tier. If the secondary node 118 determines that a backup policy is not enabled, then the No branch is taken to step 408.

In step 408, the secondary node 118 determines whether the data has been tagged by the primary node 116 to indicate that the data is stored in the primary volume 138 on a remote data storage device. The data could have been tagged by the primary node 116 as described and illustrated earlier with reference to step 306 of FIG. 3, although other methods of tagging the data can also be used. Additionally the absence of a tag is considered to be a tag, indicating that the data is stored in the primary volume 138 on a remote data storage device, in examples in which only data stored in the primary volume 138 on a local data storage device is tagged by the primary node 116 since there are only two storage tiers or location types in this example.

If the secondary node 118 determines that the data is not tagged, then the No branch is taken to step 404 and the data is stored on a local data storage device, as described and illustrated in more detail earlier. However, if the secondary node 118 determines in step 408 that the data is tagged, or if the secondary node 118 determines in step 406 that a backup policy is enabled, then a respective one of the Yes branch is taken to step 410.

In step 410, the secondary node 118 stores the data in the secondary volume 140 of the secondary composite aggregate 134 on a remote data storage device, such as the cloud storage device 131(n). In examples in which the secondary node 118 is not a backup or archival node, the tagged data can be written in step 410 directly to the cloud storage device 131(n) in this example without storing the data in a relatively high performance tier in the data storage device 130, thereby eliminating the need for a two-phase write.

In other words, the secondary node 118 does not have to wait for a subsequent determination that the data, which was relatively cold in the primary volume 138 and therefore stored on the cloud storage device 131(1), should be written from the data storage device 130 to the cloud storage device 131(n). Accordingly, the tiering layout of data in the primary volume 138 is advantageously maintained in the secondary volume 140 in this example.

Figure 5:
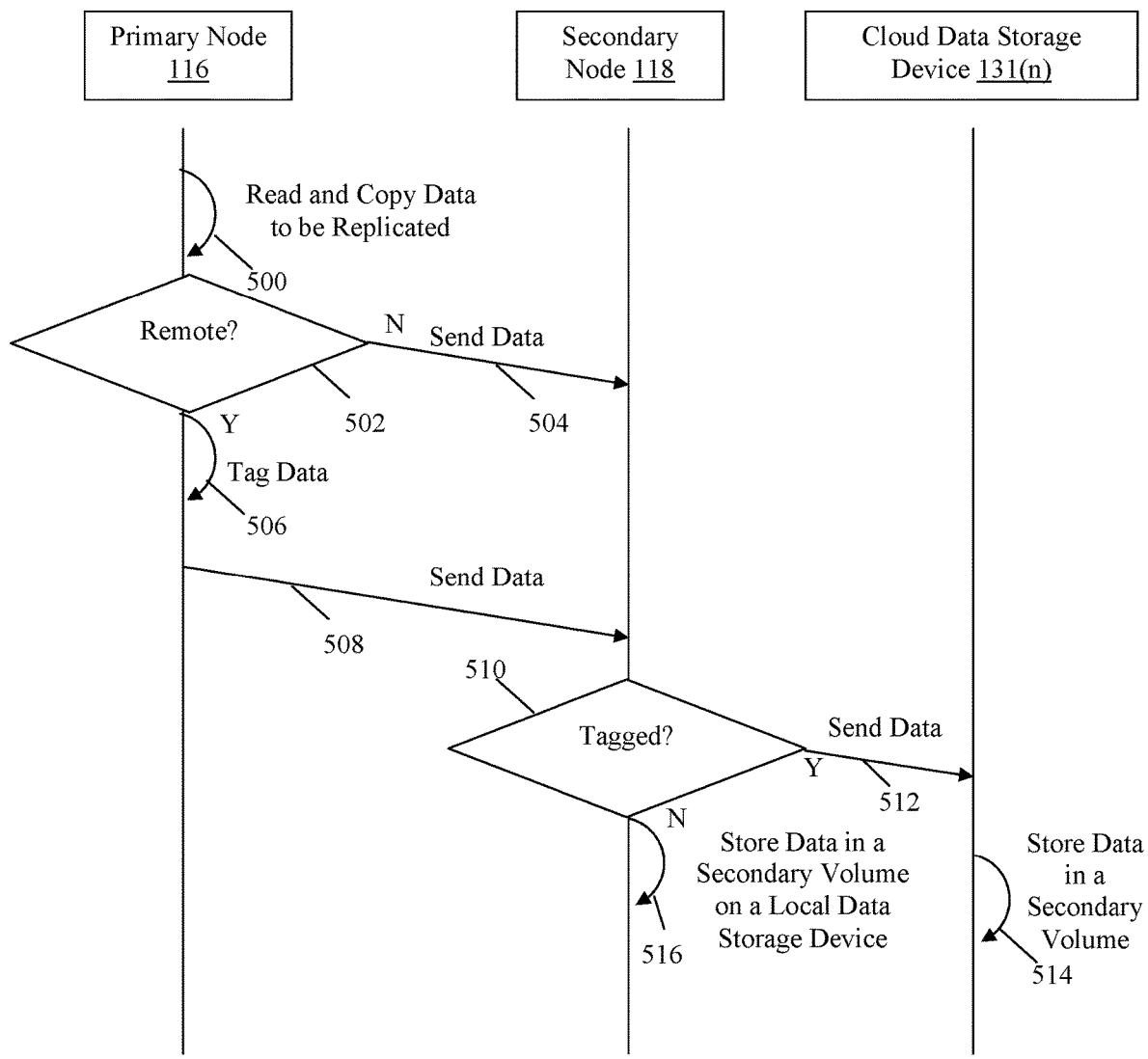
FIG. 5 is a timing diagram of an exemplary method for improved data replications in cloud environments.

Referring to FIGS. 1, 2, and 5, a timing diagram of an exemplary method for facilitating improved data replication in cloud environments, without requiring a two-phase write of cloud data, is illustrated. In step 500 in this example, the primary node 116 reads and copies data to be replicated. The data is in a volume of a composite aggregate and can be stored in and read from a local data storage device or a remote data storage device.

In step 502, the primary node 116 determines whether the data is read from a remote data storage device, such as a cloud storage device. The determination can be based on a block number or PVBN, for example. If the primary node 116 determines that the data is not read from a remote data storage device, then the No branch is taken to step 504.

In step 504, the primary node 116 sends the copy of the data to the secondary node 118. However, if the primary node 116 determines that the data is read from a remote data storage device, then the Yes branch is taken to step 506.

In step 506, the primary node 116 tags the data to indicate that the data is stored in the primary volume on a remote data storage device. The tag can be in the form of network metadata or any other type of identifier that is attached to or associated with the data as described in greater detail earlier.

In step 508, the primary node 116 sends the tagged data to the secondary node. Optionally, the message used to send the data to the secondary node can include the tag. The message can be sent over a cluster interconnect, for example, although other methods of communicating the data can also be used.

In step 510, the secondary node 118 determines whether the data, received as sent in step 504 or 508, is tagged to indicate that the data is stored in the primary volume on a remote data storage device. Optionally, the secondary node 118 can also determine whether the data is of a particular type (e.g., metadata) or whether a backup policy is enabled, as described and illustrated in more detail earlier, among other determination in other examples. In this particular example, the secondary node 118 is preconfigured to interpret the tag as indicating that the data originated from a remote data storage device. Accordingly, if the secondary node 118 determines that the data is tagged, then the Yes branch is taken to step 512.

In step 512, the secondary node 118 sends the data to a remote data storage device, which is the cloud data storage device 131(n) in this example. Optionally, the data can be sent over a WAN using an established endpoint for the cloud data storage device 131(n), although other methods can be used to communicate the data and other types of remote repositories can also be used.

In step 514, the cloud data storage device 131(n) stores the data in a secondary volume of a secondary composite aggregate. However, referring back to step 510, if the secondary node 118 determines that the data is not tagged, then the No branch is taken to step 516. In step 516, the secondary node 118 stores the data in a secondary volume on a local data storage device.

With this technology, the tiering of data is maintained such that data is stored on a remote data storage device in both primary and secondary volumes. Additionally, a secondary node can send or write data directly to a cloud data storage device without storing it locally in a relatively high performance tier and performing a relatively expensive second write when is it subsequently determined that the data is relatively cold and should be migrated to a capacity tier on a cloud data storage device. Moreover, this technology advantageously allows an administrator to more effectively determine the size of the performance tier or local data storage device needed at a secondary node, which significantly reduces the cost and resources required to facilitate data replication.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
    receiving, by a secondary computing device and via a cluster interconnect, data from a primary volume managed by a primary computing device coupled to the cluster interconnect, wherein the primary volume is within a primary composite aggregate that spans a first local data storage device hosted by the primary computing device and a first remote data storage device hosted by a cloud storage device accessible to the primary and secondary computing devices via one or more communication networks;
    determining, by the secondary computing device, that a first plurality of files within the received data was tagged with a tag to indicate that the first plurality of files was stored in the primary volume solely on the first local data storage device, wherein the tag is the same for each of the first plurality of files;
    storing, by the secondary computing device, the first plurality of files solely on a second local data storage device in a secondary volume within a second composite aggregate that spans the second local data storage device and a second remote data storage device hosted by the cloud storage device, when the determining indicates the first plurality of files was tagged to indicate that the first plurality of files was stored in the primary volume solely on the first local data storage device; and
    automatically sending, by the secondary computing device, an untagged second plurality of files within the received data via the communication networks, to an endpoint associated with the second remote data storage device hosted by the cloud storage device, for storage of the second plurality of files on the second remote data storage device, without storing the second plurality of files on the second local data storage device, to maintain a same data tiering layout between the primary and secondary volumes.

2. The method of claim 1, further comprising storing, by the secondary computing device, the first plurality of files in the secondary volume on the second local data storage device without determining whether the first plurality of files was tagged by the primary computing device to indicate that the first plurality of files was stored in the primary volume solely on the first local data storage device, when the received data comprises metadata.

3. The method of claim 1, further comprising storing, by the secondary computing device, the first plurality of files in the secondary volume on the second remote data storage device without determining whether the first plurality of files was tagged by the primary computing device to indicate that the first plurality of files was stored in the primary volume solely on the first local data storage device, when a backup policy is enabled.

4. The method of claim 1, further comprising receiving, by the secondary computing device, a message along with the data from the primary computing device, wherein the tag is incorporated into the message.

5. A non-transitory machine readable medium having stored thereon instructions for data replication in hybrid cloud environments comprising machine executable code which when executed by at least one machine causes the machine to:
receive, via a cluster interconnect, data from a primary volume managed by a primary computing device coupled to the cluster interconnect, wherein the primary volume is within a primary composite aggregate that spans a first local data storage device hosted by the primary computing device and a first remote data storage device hosted by a cloud storage device accessible to the primary computing device and a secondary computing device via one or more communication networks;
determine that a first plurality of files within the received data was tagged with a tag to indicate that the first plurality of files was stored in the primary volume solely on the first local data storage device, wherein the tag is the same for each of the first plurality of files;
store the first plurality of files solely on a second local data storage device in a secondary volume within a second composite aggregate that spans a hosted second local data storage device and a second remote data storage device hosted by the cloud storage device, when the determining indicates the first plurality of files was tagged to indicate that the first plurality of files was stored in the primary volume solely on the first local data storage device; and
automatically send an untagged second plurality of files within the received data via the communication networks, to an endpoint associated with the second remote data storage device hosted by the cloud storage device, for storage of the second plurality of files on the second remote data storage device, without storing the second plurality of files on the second local data storage device, to maintain a same data tiering layout between the primary and secondary volumes.

6. The non-transitory machine readable medium of claim 5, wherein the machine executable code when executed by the machine further causes the machine to store the first plurality of files in the secondary volume on the second local data storage device without determining whether the first plurality of files was tagged by the primary computing device to indicate that the first plurality of files was stored in the primary volume solely on the first local data storage device, when the received data comprises metadata.

7. The non-transitory machine readable medium of claim 5, wherein the machine executable code when executed by the machine further causes the machine to store the first plurality of files in the secondary volume on the second remote data storage device without determining whether the first plurality of files was tagged by the primary computing device to indicate that the first plurality of files was stored in the primary volume solely on the first local data storage device, when a backup policy is enabled.

8. The non-transitory machine readable medium of claim 5, wherein the machine executable code when executed by the machine further causes the machine to receive a message along with the data from the primary computing device, wherein the tag is incorporated into the message.

9. A secondary computing device, comprising:
a second local data storage device;
a memory containing machine readable medium comprising machine executable code having stored thereon instructions for data replication in hybrid cloud environments; and
a processor coupled to the memory, the processor configured to execute the machine executable code to cause the processor to:
receive, via a cluster interconnect, data from a primary volume managed by a primary computing device coupled to the cluster interconnect, wherein the primary volume is within a primary composite aggregate that spans a first local data storage device hosted by the primary computing device and a first remote data storage device hosted by a cloud storage device accessible to the primary and secondary computing devices via one or more communication networks;
determine that a first plurality of files within the received data was tagged with a tag to indicate that the first plurality of files was stored in the primary volume solely on the first local data storage device, wherein the tag is the same for each of the first plurality of files;
store the first plurality of files solely on a second local data storage device in a secondary volume within a second composite aggregate that spans the second local data storage device and a second remote data storage device hosted by the cloud storage device, when the determining indicates the first plurality of files was tagged to indicate that the first plurality of files was stored in the primary volume solely on the first local data storage device; and
automatically send an untagged second plurality of files within the received data via the communication networks, to an endpoint associated with the second remote data storage device hosted by the cloud storage device, for storage of the second plurality of files on the second remote data storage device, without storing the second plurality of files on the second local data storage device, to maintain a same data tiering layout between the primary and secondary volumes.

10. The secondary computing device of claim 9, wherein the processor is further configured to execute the machine executable code to further cause the processor to store the first plurality of files in the secondary volume on the second local data storage device without determining whether the first plurality of files was tagged by the primary computing device to indicate that the first plurality of files was stored in the primary volume solely on the first local data storage device, when the received data comprises metadata.

11. The secondary computing device of claim 9, wherein the processor is further configured to execute the machine executable code to further cause the processor to store the first plurality of files in the secondary volume on the second remote data storage device without determining whether the first plurality of files was tagged by the primary computing device to indicate that the first plurality of files was stored in the primary volume solely on the first local data storage device, when a backup policy is enabled.

12. The secondary computing device of claim 9, wherein the processor is further configured to execute the machine executable code to further cause the processor to receive a message along with the data from the primary computing device, wherein the tag is incorporated into the message.

13. The method of claim 1, wherein the data is received following initiation of a replication process at the primary computing device and is a copy of other data maintained in the first local data storage device hosted by the primary computing device.

14. The non-transitory machine readable medium of claim 5, wherein the data is received following initiation of a replication process at the primary computing device and is a copy of other data maintained in the first local data storage device hosted by the primary computing device.

15. The secondary computing device of claim 9, wherein the data is received following initiation of a replication process at the primary computing device and is a copy of other data maintained in the first local data storage device hosted by the primary computing device.

16. The secondary computing device of claim 9, wherein secondary composite aggregate comprises a portion hosted by another cloud storage device accessible via another one or more communication networks.

* * * * *